United States Patent [19]

Segalini

[11] 3,983,096
[45] Sept. 28, 1976

[54] POLYMERIZATION PROCESS UNDER PRESSURE IN AN ANNULAR EQUIPMENT

[75] Inventor: Angelo Segalini, S. Maria Maggiore (Novara), Italy

[73] Assignee: Montedison S.p.A., Milan, Italy

[22] Filed: Oct. 15, 1974

[21] Appl. No.: 514,405

[30] Foreign Application Priority Data
Oct. 17, 1973 Italy................................ 30210/73

[52] U.S. Cl................................. 526/64; 526/330; 526/331
[51] Int. Cl.².................. C08F 2/22; C08F 14/06; C08F 18/08
[58] Field of Search............... 260/80.81, 87.3, 89.1, 260/94.9 P

[56] References Cited
UNITED STATES PATENTS

| | | | |
|---|---|---|---|
| 3,257,362 | 6/1966 | Norwood | 260/94.9 P |
| 3,324,093 | 6/1967 | Alleman | 260/94.9 P |
| 3,405,109 | 10/1968 | Rohlfing | 260/94.9 P |
| 3,458,467 | 7/1969 | Herrle et al. | 260/89.1 |
| 3,546,158 | 12/1970 | Champion, Jr. et al. | 260/80.81 |
| 3,583,959 | 6/1971 | Shen et al. | 260/80.81 |
| 3,642,732 | 2/1972 | Yasumura et al. | 260/80.81 |
| 3,663,519 | 5/1972 | Buening | 260/80.81 |
| 3,668,165 | 6/1972 | Bergmeister et al. | 260/80.81 |
| 3,737,288 | 6/1973 | Hochman | 260/94.9 P |
| 3,816,383 | 6/1974 | Stotko | 260/94.9 P |

*Primary Examiner*—Alan Holler
*Attorney, Agent, or Firm*—Hubbell, Cohen, Stiefel & Gross

[57] ABSTRACT

An annular reactor for polymerizing and copolymerizing vinyl esters characterized by the fact that the height to width ratio is greater than 1 and preferably greater than 5, that there is a circulating pump in the lower leg of the reactor and that the pump delivery volume of the reactor is between 5 and 30 percent of the reactor total volume, and preferably about 15 percent of the reactor total volume. Methods of polymerizing and copolymerizing vinyl monomers in such a reactor are also disclosed.

6 Claims, 1 Drawing Figure

U.S. Patent   Sept. 28, 1976   3,983,096
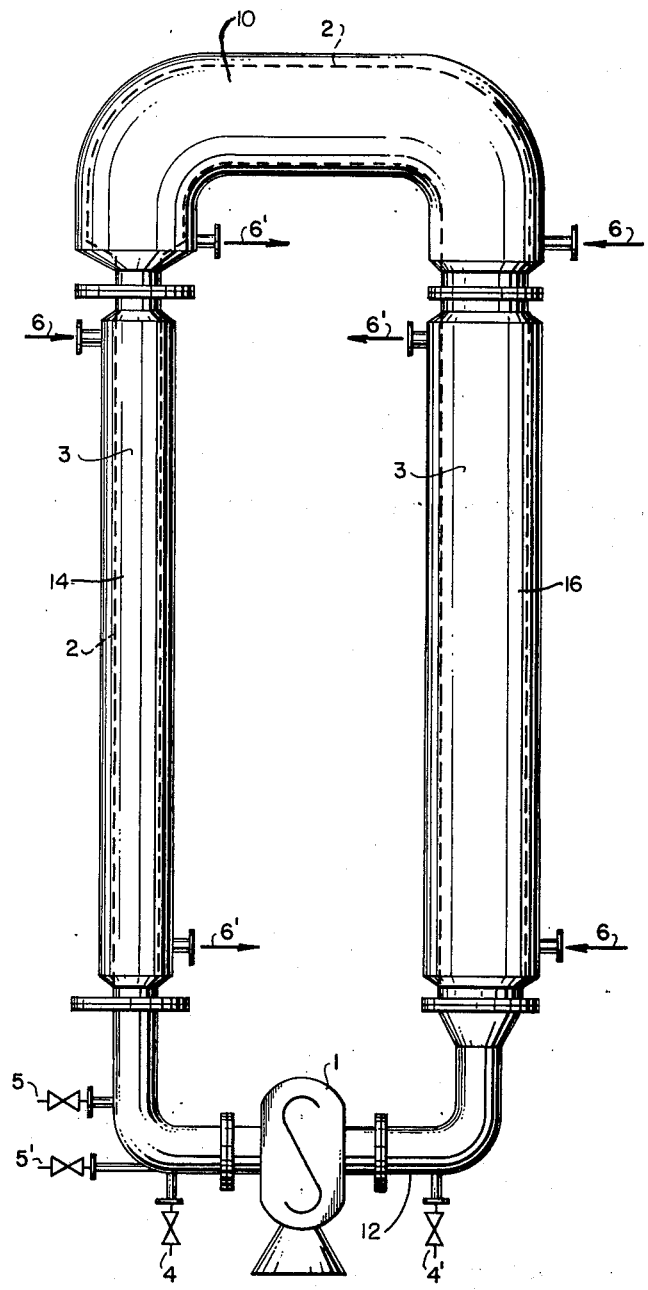

POLYMERIZATION PROCESS UNDER PRESSURE IN AN ANNULAR EQUIPMENT

BACKGROUND OF THE INVENTION

FIELD OF THE INVENTION

The present invention relates to an improved process for polymerizing vinyl monomers.

SUMMARY OF THE INVENTION

More particularly, it relates to a polymerization process under pressure, wherein the liquid and/or gaseous vinyl monomers are gradually admixed to an initial reaction medium (water, solvent, etc.), containing a small amount of monomer. The process is characterized in that it is conducted in a particular tubular ring-shaped equipment.

The equipment for carrying out the process according to this invention is of the type shown in the attached drawing and is made up of a tubular ring-shaped reactor, wherein the height/width ratio is greater than 1, and wherein the bottom is provided with a pump; this reactor being further more characterized in that the volume of the vertical section located on the pump delivery side (delivery volume) is comprised between 5 and 30 percent of the reactor total volume.

BRIEF DESCRIPTION OF THE DRAWING

The single FIGURE is a side elevational view, partly diagrammatic, of an annular reactor embodying the present invention.

DETAILED DESCRIPTION OF THE PREFERRED EMBODIMENT

Referring now to the drawing in detail, the annular reactor 3 is provided with upper and lower legs 10 and 12, and side legs 14 and 16 which are proportioned so that the ratio of the length of the side legs to the length of the top and bottom legs is greater than 1 and preferably greater than 5. By length of legs is meant the average length of the leg which, in a reactor as illustrated in the enclosed drawing, is the length of the leg along the longitudinal axis thereof.

Disposed about the upper leg 10 and a major portion of each of the side legs 14 and 16 adjacent the upper leg 10 is a thermal regulating jacket 2 having a fluid inlet 6 and a fluid outlet 6' for controlling the reaction temperature within the reactor 3. Reagents are introduced into the reactor 3 through reagent inlets 5 and 5', and discharge nozzles 4 and 4' are provided in the lower leg 12 for removing polymers after processing and for cleaning the reactor.

Also provided in the lower leg 12 is a pump for circulating reactants around the annular reactor 3. As shown, flow is intended to be clockwise so that the delivery side of the pump is leg 14. With reference to the drawing, the pump delivery volume is the volume of leg 14. The reactor must have a pump delivery volume of between 5 and 30 percent of the reactor total volume: to accomplish this the cross section of leg 14 is significantly smaller than the cross section of the other legs, as may be seen in the drawing.

It is most preferred that the height to width ratio of reactor 3 be at least 5 and that the delivery volume be about 15 percent of the reactor total volume.

In the various experimental runs employing the annular reactor as will be described hereinafter, the annular reactor employed therein had a total volume of 36 liters, the top and bottom legs had a length of about 90 cm., and the two side legs 14 and 16 had a length of 150 cm. The cross sectional diameter of the legs 10, and 16 was 12 cm., and the cross sectional diameter of legs 12 and 14 was 5 cm., said cross section having been circular. Naturally, other cross sectional shapes could be employed. As will be seen from the following description, the nature of the circulating pump 1 may be varied depending upon the reaction taking place within the reactor 3.

The use of an annular tubular reactor, having the characteristics described hereinbefore, for the polymerization of ethylenically unsaturated monomers offers several advantages with respect to the traditional processes in which the reactor is an autoclave.

In the case of the preparation of homo- and copolymers of vinyl esters in an emulsion starting from liquid or gaseous monomers, it is possible, when substituting the present invention for traditional techniques, to obtain considerably higher capacities and products having improved characteristics, such as, for example:

smaller diameter of particles;
higher binding power for pigments;
higher water resistance of film; and
higher viscosity.

In the particular case of the production of copolymers starting from liquid vinyl esters and gaseous monomers, besides the above advantages, the following are obtained:

both operating pressure and reaction time being identical, the products obtained have a higher content of polymerized gaseous comonomer; and the gaseous comonomer content in the copolymer being identical, the process according to this invention permits to conduct the reaction at a lower pressure and/or for a shorter time.

Furthermore, the process of this invention offers the advantage of requiring simpler and less expensive equipment, as it can be constructed by using pipe sections having a smaller diameter than of the tank of a traditional autoclave and, consequently, a correspondingly reduced thickness; all of this resulting in lower operating costs due to the lesser power requirement for the reaction mass circulation.

By the process of the present invention, it is possible to polymerize ethylenically unsaturated liquid and/or gaseous monomers.

In particular, it is possible to copolymerize vinyl esters such as, vinyl acetate, propionate, versatate, butyrate or benzoate; or methyl, ethyl, butyl or octyl acrylate or maleate or styrene with ethylenically unsaturated gaseous comonomers such as, vinyl chloride, ethylene, propylene, butene, hexene or mixtures of olefins having from 2 to 6 carbon atoms.

The above vinyl versatate is a mixture of vinyl esters of acids having 10 carbon atoms, each of which have the following structure:

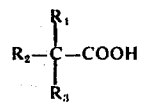

wherein $R_1$, $R_2$, and $R_3$ are linear alkyls, at least one being $—CH_3$. (Vinyl versatate is sold by Shell Oil Co. under the trademark VEO VA 10.)

Very advantageous is the preparation of vinyl acetate ethylene copolymers containing from 5 to 50 percent weight of ethylene.

The preparation of vinyl acetate ethylene vinyl chloride copolymers containing from 5 to 40 percent by weight of ethylene, and from 5 to 40 percent by weight of vinyl chloride is also of interest due to the properties of the products obtained.

The known water soluble and oil soluble radical initiators may be employed as catalysts.

In particular, when aqueous dispersions of polymers are to be prepared, the known ionic or nonionic surface active agents of the commercial type may be used, either individually or in combination with one another, as emulsifiers.

The usual water soluble natural and synthetic products may be used as protecting colloids and thickening agents.

For the polymerization in solution it is possible to use, as solvents, the most usual organic compounds capable of dissolving the monomers and, if applicable, also the corresponding polymers such as, methanol, ethyl acetate, methyl acetate, acetic acid, acetone, trichloroethylene, toluene, benzene, tert.-butyl alcohol, etc.

For the polymerization in suspension, the known dispersants and stabilizers may be employed.

The operating pressure may range from 1 to 300 kg/sg.cm. depending upon the composition of the resin to be obtained. The reaction temperature may range from 15° to 150°C, preferably from 40° to 100°C, according to the polymerization technique and catalyst system employed. Reaction may be continuous or discontinuous.

The following examples of discontinuous polymerization in emulsion, in solution and in suspension, are given to illustrate the advantages attainable by the process of the present invention, without a limitation thereof.

EMULSION POLYMERIZATION

EXAMPLE 1

Process According to the Invention: A

A ring shaped stainless steel, 36 l. reactor, provided with a jacket for the circulation of the thermal regulating fluid, and with a circulating rotary pump 1, was fed with an initial polymerization reaction medium consisting of:

| | |
|---|---|
| Vinyl acetate | 3,296 g |
| Water | 12,453 g |

| -continued | |
|---|---|
| Sodium dodecylbenzenesulphonate | 62 g |
| Condensate of ethylene oxide with oleyl alcohol | 315 g |
| High viscosity hydroxyethylcellulose | 157 g |
| Potassium persulphate | 22 g |
| Crystalline sodium acetate | 104 g |

After having discharged the gases from the reactor, ethylene was introduced thereinto until reaching a pressure of about 20 kg/sq.cm. (gauge); at a temperature of the mass equal to 90°C and at a circulation rate of the fluid under polymerization equal to 2,500 l/h, the reactor was fed, by means of a constant delivery proportioning pump, in about a 4-hour period with the following reagents:

| | |
|---|---|
| Vinyl acetate | 10,642 g |
| Potassium persulphate in a 5% aqueous solution | 1,740 g |

Finishing was conducted for 2 hours. During the whole reaction period, make up ethylene was fed as ethylene was consumed, so as to keep the operating pressure at the preestablished value. The product thus obtained exhibited the characteristics reported in Table 1.

EXAMPLE 2

Conventional Process: B

In a stainless steel autoclave, having a capacity of 36 l. fitted with an anchor type stirrer rotating at a speed of 100 rpm, a copolymerization reaction was conducted according to the same recipe and modalities as in Example 1, and at a pressure of 20 kg/sq.cm. (gauge). The resulting latex exhibited the characteristics reported in Table 1.

EXAMPLE 3

Conventional Process: B

The autoclave was operated as in Example 2, but at an operating pressure of 30 kg/sq.cm. The product characteristics are reported in Table 1.

EXAMPLE 4

Conventional Process: B

The autoclave was operated as in Example 2, but employing a total reaction time of 10 hours (8 hours of monomer feeding and 2 hours of finishing). The product characteristics are reported in Table 1.

TABLE 1

| VINYL ACETATE-ETHYLENE COPOLYMERIZATION IN EMULSION | | | | |
|---|---|---|---|---|
| EXAMPLES NO. | 1 | 2 | 3 | 4 |
| Process followed | A | B | B | B |
| Reaction time h | 6 | 6 | 6 | 10 |
| Operating pressure (gauge) kg/sq.cm. | 20 | 20 | 30 | 20 |
| Combined ethylene content: % on the resin % by weight | 14 | 10 | 14 | 14 |
| Brookfield RVT viscosity at 20°C, 20 rpm cP | 4420 | 4200 | 4100 | 4000 |
| Film building min. temperature °C | +4 | +7 | +4 | +4 |
| Average diameter of particles $\mu$ | 0.15 | 0.25 | 0.20 | 0.20 |
| Percent elongation at break of the film at 23°C and 50% of relative humidity | 550 | 400 | 530 | 550 |
| Tensile strength of the film at 23°C and 50% of relative humidity kg/sq.cm. | 23 | 24 | 22 | 22 |
| Whitening (after $2^m - 10^m - 25^m$) of | | | | |

TABLE 1-continued

VINYL ACETATE-ETHYLENE COPOLYMERIZATION IN EMULSION

| EXAMPLES NO. | 1 | 2 | 3 | 4 |
|---|---|---|---|---|
| the film immerged in water at 20°C T% | 0/0/10 | 0/0/20 | 0/0/15 | 0/0/15 |

The advantages offered by the process according to this invention (Example 1) clearly appear from a comparison of the results reported in Table 1. In fact, to obtain by conventional methods (Examples 2, 3 and 4), products like those yielded by the claimed process, it is necessary to employ a higher operating pressure (30 kg/sq.cm., as in Example 3) or longer reaction times (10 hours, as in Example 4).

EXAMPLE 5

Process According to the Invention: A

An annular, 36-liter capacity equipment as per Example 1 was fed with a polymerization initial medium consisting of:

| Water | 7,662 g |
|---|---|
| High viscosity hydroxyethylcellulose | 183 g |
| Sodium dodecylbenzenesulphonate | 72 g |
| Sodium acetate | 24 g |

After having discharged the gases from the reactor, at a temperature of the mass equal to 80°C, the following reagents were introduced in a 2-hour period:

| Vinyl acetate | 9,900 g |
|---|---|
| Vinyl versatate | 4,241 g |
| Potassium persulphate | 71 g |
| Sodium acetate | 94 g |
| Water | 6,422 g |

An aging period of about 1 hour followed; during the entire process the operating pressure did not exceed 2 kg/sq.cm. (gauge). The total time required by the reaction was 3 hours. The product characteristics are reported in Table 2.

EXAMPLE 6

Conventional Process: B

This operated as in Example 5, with the only exception being that a conventional method was followed which employed a 36 l. autoclave provided with a rotary stirrer. Time required by the reaction: 5 hours.

The characteristics of the products, obtained at a maximum pressure of 2 kg/sq.cm., are reported in Table 2.

EXAMPLE 7

Conventional Process: B

This too was operated as in Example 5, except that a conventional 36 l. reactor, provided with a rotary stirrer and a tube bundle condenser, was used. Polymerization was conducted at room pressure, in a total period of about 7 hours. The product characteristics are reported in Table 2.

TABLE 2

VINYL ACETATE-VINYL VERSATATE COPOLYMERIZATION IN EMULSION

| EXAMPLES NO. | 5 | 6 | 7 |
|---|---|---|---|
| Process followed | A | B | B |
| Operating pressure (gauge) kg/sq.cm. | 2 | 2 | 0 |
| Reaction time h | 3 | 5 | 7 |
| Diameter of particles $\mu$ | 0.10 | 0.15 | 0.15 |
| Brookfield RVT viscosity at 20°C, 20 rpm cP | 8500 | 2700 | 2500 |
| Film building minimum temperature °C | 5 | 6 | 6 |
| Whitening (after $2^m$-$10^m$-$25^m$) of the film immersed in water at 20°C T% | 0/0/5 | 0/0/15 | 0/0/15 |

From a comparison among the results reported herein, it clearly appears that the process according to the present invention (Example 5) achieves, when compared with the conventional technologies (Examples 6 and 7), a higher dispersion degree of the particles (diameter = 0.10 $\mu$ instead of 0.15 $\mu$), a higher viscosity of the dispersion (8500 cP instead of 2700–2500 cP) and a lesser whitening of the film in water (turbidimetry: T = 5% instead of 15% after a 25 minute immersion). Finally, the reaction of the present invention takes place in a shorter time.

EXAMPLE 8

Process According to the Invention: A

Example 1 was followed as regards the equipment, operating modalities and recipe, with the exception that it was operated at a pressure of 35 kg/sq. cm. and that, as a third comonomer, vinyl chloride, in partial replacement of vinyl acetate, was employed in the following amounts:

| Vinyl acetate | 13,570 g |
|---|---|
| Vinyl chloride | 4,523 g |

Said mixture was fed according to the times indicated in Example 1. The product exhibited the charactertistics reported in Table 3.

EXAMPLE 9

Conventional Process: B

This was operated as in Example 8, with the exception that the conventional process, conducted in an autoclave provided with a rotary stirrer, was followed. The product characteristics are reported in Table 3.

TABLE 3

VINYL ACETATE-ETHYLENE-VINYL CHLORIDE COPOLYMERIZATION IN EMULSION

| EXAMPLES NO. | | 8 | 9 |
|---|---|---|---|
| Process followed | | A | B |
| Reaction time | h | 6 | 6 |
| Composition of the vinyl acetate-ethylene-vinyl chloride resin | % | 60/20/20 | 65/15/20 |

TABLE 3-continued

VINYL ACETATE-ETHYLENE-VINYL CHLORIDE
COPOLYMERIZATION IN EMULSION

| EXAMPLES | | NO. | 8 | 9 |
|---|---|---|---|---|
| Brookfield RVT viscosity at 20°C, 20 rpm | | cP | 4500 | 4200 |
| Average diameter of particles | | μ | 0.14 | 0.20 |
| Whitening (after $2^m$-$10^m$-$25^m$) of the film dipped in water at 20°C | | | 0/0/0 | 0/0/10 |

From a comparison between the data reported in Table 3, it will be seen that the process according to the present invention (Example 8) achieves, when compared with the conventional method (Example 9), a higher ethylene content, a higher viscosity, a higher dispersion degree and a higher resistance to water of the non-pigmented film.

EXAMPLE 10

Process According to the Invention: A

The equipment described in Example 1 was fed with an initial polymerization medium consisting of:

| | |
|---|---|
| Water | 11,900 g |
| Vinyl acetate | 2,300 g |
| Sodium dodecylbenzene-sulphonate | 28 g |
| Condensate of ethylene oxide and oleyl alcohol | 254 g |
| Polyvinyl alcohol (at a 88% partial hydrolysis) | 588 g |
| Ammonium persulphate | 20 g |
| Sodium metabisulphite | 16 g |
| Crystalline sodium acetate | 81 g |

After having discharged the gases from the reactor, the same was fed with ethylene up to a pressure of about 40 kg/sq.cm.; at a temperature of the mass of about 55°C and at a polymerization fluid circulating rate of 2,500 l/h and throughout a period of about four hours, the following reagents were introduced into the reactor by means of constant capacity proportioning pumps:

| | |
|---|---|
| Vinyl acetate | 9,300 g |
| Ammonium persulphate in a 4% aqueous solution | 1,500 g |
| Sodium metabisulphite in a 3% aqueous solution | 1,200 g |

Finishing was conducted for two hours. During the whole reaction period make up ethylene was added as ethylene consumed, so as to keep the operating pressure at a prefixed value. The product obtained exhibited the characteristics reported in Table 4.

EXAMPLE 11

Conventional Process: B

This was operated as in Example 10, but the process was conducted according to the conventional technology, in an autoclave provided with a rotary stirrer and at a higher operating pressure. The product characteristics are reported in Table 4.

TABLE 4

VINYL ACETATE-ETHYLENE COPOLYMERIZATION
IN EMULSION

| EXAMPLES | NO. | 10 | 11 |
|---|---|---|---|
| Process followed | | A | B |
| Reaction time | h | 6 | 6 |
| Operating pressure (gauge) | kg/sq. cm. | 40 | 55 |
| Combined ethylene content of the resin | % by weight | 20 | 20 |
| Brookfield RVT viscosity at 20°C, 20 r.p.m. | cP | 20,000 | 18,000 |
| Minimum film building temperature | °C | −3 | −3 |
| Bonding power: rigid PVC/beech-wood binding | kg/4cm | 60 | 55 |

From a comparison between the data reported above, it can be seen that the process according to this invention (Example 10) achieves, when compared with the conventional process (Example 11), a higher viscosity of the dispersion, an identical amount of combined ethylene at a lower operating pressure and a higher bonding power of the resin.

SUSPENSION POLYMERIZATION

EXAMPLE 12

Process According to the Invention: A

An annular equipment like that of Example 1, except that the circulating pump is of the helical type, was fed with an initial polymerization medium made up of:

| | |
|---|---|
| Water | 15,000 g |
| Polyvinyl alcohol | 30 g |
| Low viscosity hydroxyethylcellulose | 45 g |
| Vinyl acetate | 3,000 g |
| Benzoyl peroxide | 89 g |

The gases were discharged from the reactor and ethylene was introduced thereinto up to a pressure of 30 kg/sq.cm., the reaction mass was thermal regulated at 75°–80°C and at such temperature, during a four hour period, the remaining amount of vinyl acetate (10,000 g) and of initiator (100 g) was admixed, while make up ethylene was discontinuously fed as ethylene was consumed.

At the conclusion of a finishing period of about one hour and 30 minutes, the gases were discharged from the equipment and the product, consisting of small white spheroidal resin beads, having an ethylene content of 18 percent by weight, was discharged. Total time required by the process: 6 hours.

EXAMPLE 13

Conventional Process: B

This was operated as in Example 12, but following the conventional process (in an autoclave provided with rotary stirrer); under the same conditions, a resin in beads was obtained, whose ethylene content was equal to 15 percent by weight. Total time required by the process: 6 hours.

EXAMPLE 14

Process According to the Invention: A

By employing the same method, equipment and charge amounts as in Example 12, except that only vinyl acetate was used as a monomer, polymerization was conducted at a maximum pressure of 2 kg/sq. cm.

and beads were obtained. Total reaction time: about 5 hours.

EXAMPLE 15

Conventional Process: B

This was operated as in Example 14, except that the reaction was conducted according to the conventional process, in an autoclave provided with a rotary stirrer; the same operation for polymerizing vinyl acetate, carried out under the same conditions, required a total reaction time of about 8 hours.

EXAMPLE 16

Convention Process: B

In a conventional reactor having a capacity of about 40 l., provided with a rotary stirrer and a tube bundle condenser, vinyl acetate was polymerized in beads at room pressure employing a technique and recipes like those of Example 12. The total reaction time was approximately 10 hours. The results obtained from the polymerization in suspension (in beads) according to what described in Examples 12 to 16 are reported in Table 5.

TABLE 5

| POLYMERIZATION IN SUSPENSION | | | | | | |
|---|---|---|---|---|---|---|
| EXAMPLES | NO. | 12 | 13 | 14 | 15 | 16 |
| Product prepared | | I | I | II | II | II |
| Process employed | | A | B | A | B | B |
| Combined ethylene content of the resin: % by weight | | 18 | 15 | — | — | — |
| Operating pressure (gauge) kg/sq.cm. | | 30 | 30 | 2 | 2 | 0 |
| Reaction time (hours) | | 6 | 6 | 5 | 8 | 10 |

I= vinyl acetate - ethylene copolymer
II= vinyl acetate homopolymer

From a comparison of the data reported herein, it can be seen that the process according to the present invention (Examples 12 and 14) achieves, by polymerization in suspension, vinyl acetate ethylene copolymers in beads having a higher ethylene content (Example 12), and vinyl acetate homopolymers in beads in a shorter reaction time (Example 14) than can be achieved with the conventional processes of Examples 13 and 15–16 respectively.

SOLUTION POLYMERIZATION

EXAMPLE 17

Process According to the Invention: A

An annular equipment as utilized in Example 1, except that the circulating pump was of the gear type, was fed with 20 percent by weight of the total charge consisting of:

| Technical grade methyl acetate | 14,400 g |
|---|---|
| Vinyl acetate | 16,000 g |
| Azo-bis-isobutyronitrile | 140 g |

The gases were discharged from the equipment and ethylene was introduced therein until reaching a pressure of 40 kg/sq.cm., the mass was heated to 70°–80°C and at such temperature the reactor was fed, during a six hour period, with the remaining amount of the charge and make up ethylene discontinuously fed as ethylene was consumed.

After a two hour period of finishing, the product was discharged; the conversion of vinyl acetate into polymer was about 97 percent. The resin, isolated from the solution according to the usual techniques, contained 28 percent of combined ethylene (see Table 6).

EXAMPLE 18

Conventional Process: B

This was operated as in Example 17, but according to a conventional process in an autoclave provided with a rotary stirrer; the copolymerization of the same monomers, under the same conditions, yielded a product similar to that of Example 17, except the combined ethylene content was only 22 percent (see Table 6).

EXAMPLE 19

Process According to the Invention: A

By using the same process, equipment and charge amounts as in Example 17, with the exception of the recipe, which did not include ethylene, homopolymerization was conducted in solution at a pressure of 2 kg/sq.cm.; total time required for the reaction was about 10 hours (see Table 6).

EXAMPLE 20

Conventional Process: B

It was operated as in Example 19, but in a rotary stirrer autoclave according to a conventional process; the same homopolymerization reaction of vinyl acetate in technical grade methyl acetate, carried out under the same conditions, required a total time of about 15 hours (see Table 6).

EXAMPLE 21

Conventional Process: B

This was operated as in Example 20, except that polymerization was conducted at room pressure in a conventional equipment provided with a tube bundle condenser; a product similar to that of Example 20 was obtained, but in a total reaction time of about 20 hours (see Table 6).

TABLE 6

| POLYMERIZATION IN SOLUTION | | | | | | |
|---|---|---|---|---|---|---|
| EXAMPLES | NO. | 17 | 18 | 19 | 20 | 21 |
| Product prepared | | I | I | II | II | II |
| Process employed | | A | B | A | B | B |
| Combined ethylene content of the resin: % by weight | | 28 | 22 | — | — | — |
| Operating pressure (gauge) kg/sq.cm. | | 40 | 40 | 2 | 2 | 0 |
| Reaction time (hours) | | 8 | 8 | 10 | 15 | 20 |

I=vinyl acetate-ethylene copolymer
II=vinyl acetate homopolymer

From a comparison among the data reported herein, it can been seen that the process according to the present invention achieves preparation by polymerization in solution of vinyl acetate ethylene copolymers having a higher ethylene content (Example 17), and vinyl acetate homopolymers in a shorter reaction time (Example 19) than can be achieved by the conventional processes of Examples 18 and 20–21 respectively.

Variations can, of course, be made without departing from the spirit and scope of the invention.

Having thus described the invention, what is desired to be secured by Letters Patent and hereby claimed is:

1. In a process for polymerizing under pressure fluid vinyl monomers which are gradually admixed to an initial reaction medium containing a portion of monomer, wherein the improvement comprises conducting the polymerization in an annular reactor including bottom and top legs joined by two vertical legs and having a height to width ratio greater than 1, a circulating pump in said bottom leg, the vertical leg into which said pump discharges having a volume of between about 5 and 30 percent of the reactor total volume.

2. Polymerization process of claim 1, wherein the monomers are polymerized in an aqueous emulsion.

3. Polymerization process of claim 1, wherein vinyl acetate is polymerized.

4. Polymerization process of claim 1, wherein a mixture of vinyl esters and gaseous ethylenically unsaturated monomers is polymerized.

5. Polymerization process of claim 4, wherein vinyl acetate ethylene copolymers having an ethylene content ranging from 5 to 50 percent by weight as prepared.

6. Polymerization process of claim 4, wherein vinyl acetate ethylene-vinyl chloride terpolymers having an ethylene content of between 5 and 40 percent by weight and a vinyl chloride content of between 5 and 40 percent by weight are prepared.

* * * * *